3,201,203
HIGH PRESSURE CONTACTING APPARATUS
William J. Cerveny, Lansing, Ill., assignor to Standard Oil Company, Chicago, Ill., a corporation of Indiana
Filed July 17, 1961, Ser. No. 129,933
7 Claims. (Cl. 23—259)

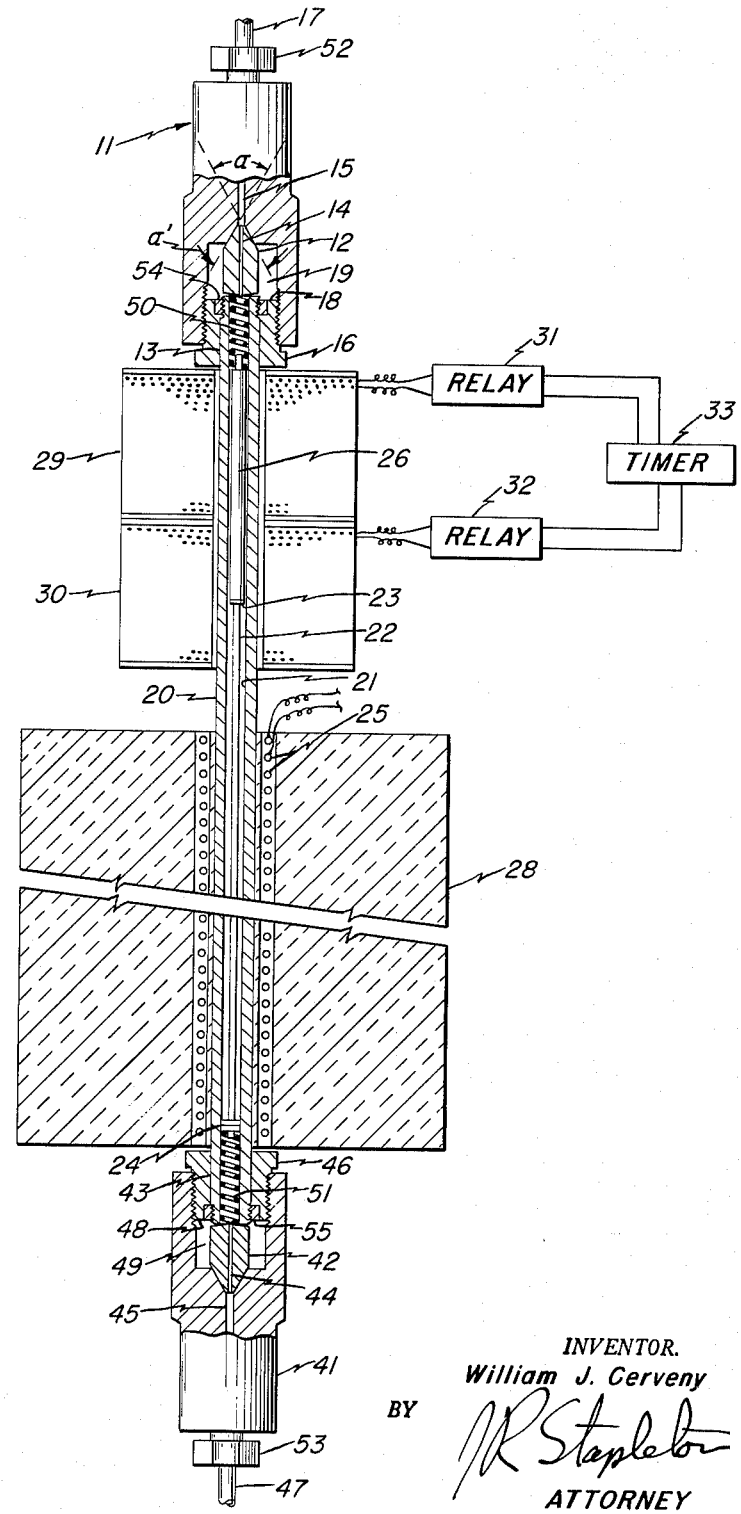

This invention relates to a high pressure contacting apparatus and it pertains, more particularly, to an improved high pressure connector capable of maintaining very high contacting pressures within a high pressure contacting apparatus. In a particular embodiment, this invention relates to a high pressure reactor and especially to the high pressure connector in combination with a high pressure reaction zone.

An object of this invention is to provide a contacting apparatus which is particularly suitable for contacting two immiscible phases at high pressures up to 100,000 p.s.i. or higher and at high temperatures up to 1,000° F. or higher. A particular object is to provide an improved connector for use at the inlet and/or outlet of a contacting vessel employed in the contacting apparatus. A further object is to provide a high pressure contacting apparatus and connector therefor which is particularly suitable for use in small scale or laboratory contacting of immiscible phases wherein critically close control of the contacting is desired.

Contacting apparatus for use in relatively high pressure contacting are well known to the prior art. For example, W. E. Kuentzel et al., U.S. 2,631,091 has provided a contacting apparatus capable of use in contacting immiscible phases at pressures in the range of 1,000 to 15,000 p.s.i. Many other contacting apparatus are well known and available commercially. Often, the prior art contacting apparatus employs a stirrer and packing gland or a controlled clearance stirring gland to effect intimate contacting of immiscible phases under pressure. Another type of pressurized contactor is a rocking vessel containing a steel ball. Heat convention is also used for mixing under high pressures. Where a steel ball contactor or heat convection are used for stirring, the stirring mechanism does not lend itself to intimate mixing of immiscible phases. Where a stirrer and gland are provided, at high pressures, the apparatus becomes unsatisfactory because of leaks, contamination of reactants, or even complete inability to attain very high pressures.

The present invention provides a high pressure connector assembly capable of maintaining high pressures within a high pressure contacting apparatus, e.g. high pressure reactor. In a particular embodiment of the present invention, a high pressure contacting apparatus is provided which utilizes the high pressure connector assembly in combination with a high pressure contacting zone.

The high pressure connector assembly of this invention is capable of use in combination with any pressure vessel having a tubular inlet. The high pressure connector assembly essentially includes a high pressure connector element which is a solid cylinder having two conically tapered ends. Each of the ends has the configuration of a section of a cone having its axis concentric with the axis of the cylinder. The conical configuration of one end corresponds to a section of a cone having an acute angle at its apex while the conical configuration of the second end corresponds to a section of a cone having an obtuse angle at its apex. The connector element has an axial conduit therethrough and is held with the obtuse conical section and abutting the tubular inlet of the pressure vessel. Holding the connector element in position is accomplished with a pressure cap which fits over the connector element and is attached to the pressure vessel urging the connector element against the inlet of the pressure vessel to form a pressure seal therewith. The cap has a conical receptacle for receiving the acute conical section end of the connector element and also has a conduit through the cap opening outside of the cap. The conduit in the cap is preferably an axial conduit. The angle of the apex of the cone of the receptacle is at least as great as the acute angle of the end of the pressure connector element received thereby. The conduits through the cap and pressure connector element provide a continuous passage to the inlet of the pressure vessel. The high pressure connector defined above can be used for any pressure vessel for providing a high pressure connection at the inlet of the vessel. The connector may also be provided at the outlet end maintaining high pressures in a vessel in which a continuous contacting operation is carried out.

In a particular embodiment of this invention, the pressure vessel is a tubular reactor and a high pressure connector described above is provided at each end of the tubular reactor for continuous operation of the reactor. However, where it is desired to utilize the reactor for batch operations, the conduit through the pressure connector element at one end of the reactor is eliminated and the charge and withdrawal of feeds is made through one end only.

In another aspect of this invention, the cap is readily removable from the pressure vessel, e.g. by being threaded thereto, and provides ready access to the contents of the vessel. The readily removable cap also permits simple exchange of pressure connector elements which have or do not have conduits therethrough for more readily adapting the apparatus for use in continuous or batch operation as may be desired.

In the preferred embodiment of this invention, the connector is used in combination with a pressure vessel employing a solenoid actuated mixer. Such pressure vessels are available under the trade name "Magne-Dash." A pressure vessel employing a solenoid actuated mixture is also described by W. E. Kuentzel et al. U.S. 2,631,091 patented March 10, 1953.

The invention may be more clearly understood from the following detailed description of a specific example thereof, read in conjunction with the accompanying drawings in which the figure is a schematic view of the pressurized vessel employing the present invention.

With reference to the figure of the drawing, pressure cap 11 is threaded to sleeve 18 which is loose fitted around the inlet 13 of reactor tube 20. Collar 54 is threaded to inlet 13 and, in combination with cap 11, holds loose fitted sleeve 18 in position. Plug 12 is a high pressure connector element and is held in position against inlet 13 by means of cap 11. The angle $\alpha$ of the conical receptacle in cap 11 is 60° and the angle $\alpha'$ of the apex of the acute conical section of plug 12 is 59°. The angle of the apex of the cone at the other end of plug 12 is 160°.

Conduits 14 and 15 are provided in plug 12 and cap 11 respectively and provide a passage between the inlet of reaction zone 21 and pressure cap inlet 17. Pressure cap inlet 17 is threaded by a high pressure connection to cap 11. Annular space 19 surrounds plug 12 and is included to permit use of various size plugs. Annular space 19 permits variances in the amount of tightening of cap 11 to accommodate such different sized plugs. Tightening cap 11 results in distortion of plug 12 and proper pressure seal for operation at very high pressures. It is preferred that cap 11 be tightened sufficiently to distort plug 12 sufficiently to provide sealing of the surface of plug 12 against the surface of the receptacle in cap 11 and to further provide pressure-tight setting of plug 12 against the end of inlet 13.

Threaded sleeve 18 is connected to a hexagonal flange 16 which provides a wrench-receiving surface for separation of sleeve 18 from cap 11 by unthreading.

Elements 41–49 and 55 correspond to elements 11–19 and 54 respectively, and provide the same functions at the other end of tube 20. Plug 42 may be conveniently replaced with a plug of like configuration having no conduit 44 therethrough for use in batch contacing operations.

Within contacting tube 20 is stem 22 attached to soft iron core 26 via nut 23 and also attached at the other end to mixer 24 within reaction chamber 21. Surrounding the upper end of tube 20 and two solenoids 29 and 30. The current to solenoid 30 is controlled by relay 32 and the current to solenoid 29 is controlled by relay 31. Timer 33 is capable of applying a current alternately to each relationship.

Surrounding the lower end of tube 20 is heating coil 25, which, in the illustrated embodiment, consists of No. 22 Nichrome wire insulated with 1/4-inch diameter fishspine beads. The ends of the wire protrude from the coil 25 for connection to a power source, the particular coil 25 being of about 600 w. capacity. Surrounding coil 25 is insulation material 28, e.g. magnesia, vermiculite, or the like.

In the embodiment of the figure, tube 20 is Type 316 stainless steel tubing having an outer diameter of 9/16-inch and an inner diameter of 3/16-inch. Within the tube, in addition to the stem 22 carrying core 26 and mixer 24, are springs 50 and 51 which limit the stroke of stem 22 and core 26 within tube 20. The springs are made of non-magnetic material preferably stainless steel of austenitic structure although copper, brass and other non-magnetic materials may well be used. In contrast, core 26 is the magnetic core for solenoids 29 and 30 and is made of a ferrous or other magnetizable material.

In operation, timer 33 alternately applies a current to relays 31 and 32. The timer permits individual control of the "on" time of each relay. (A convenient commercially available relay and timer combination is offered by G. C. Wilson and Company, Chatham, N.J., as Repeat Cycle Timer Model No. 1 with 1/10 standard cycle time.) Any dual control timer which permits separate control of each cycle in the range of 0.05 to 5 seconds would be suitable. Relays 31 and 32 control solenoids 29 and 30 respectively and core 26 carries stem 22 and mixer 24 is positively actuated for movement in both upward and downward directions and may be controlled with great precision. Thus, the stirrer mechanism, comprising stem 22, core 26 and mixer 24, is moved up and down (or back and forth with horizontal mounting of the reactor tube). The springs at either end of the reactor tube limit the length of the mixer assemblies stroke and help to reverse direction of the stroke. Stirring of the reactants contained in chamber 21 is thereby obtained. During stirring, the temperature of chamber 21 may be controlled by heating coil 25. Chamber 21 is pressurized at cap inlets 17 and 47. A slightly greater pressure provided at cap inlet 17 causse flow of reactants from cap inlet 17 through conduits 15 and 14, through chamber 21, through conduits 44 and 45 and out cap inlet 47. Direction of flow may be reversed if desired.

The illustrated device may be operated at very high temperatures and pressures without loss of pressure or reactants through the reactor closures. Maintenance of high pressure within chamber 21 is effected by plugs 12 and 44, caps 11 and 41 and ends 13 and 43 respectively.

The apparatus may be readily dismantled for removal of plugs 12 and 42 by removing caps 11 and 41 from threaded sleeves 18 and 48. Before unthreading caps 11 and 41, nuts 52 and 53, which hold tubes 17 and 47 respectively in pressure sealed connection with caps 11 and 41 respectively, should be loosened to permit unthreading of caps 11 and 41 from sleeves 18 and 48 respectively without damaging tubes 17 and 47. Tube 20 may conveniently be removed by unthreading sleeves 18 and 48, using flanges 16 and 46 attached to sleeves 18 and 48 respectively. Flanges 16 and 36 are hexagonal flanges configurated to receive a crescent wrench.

The following runs of the contacting of immiscible phases in a device of this invention, employing the high pressure connection assembly of this invention, are offered in further illustration of the invention. In each run, the instrument described with reference to the drawing was modified for batch operation by replacing plug 42 with an identically configurated plug omitting conduit 44 therethrough. All plugs used were about 1 1/16-inches in length and 9/16-inch in diameter.

*Run I*

This run was made for the purpose of testing the instrument at high temperatures and very high pressures for proper pressure scale of contents within the contacting zone. Accordingly, the reactor was filled with water and the pressure in the reactor was then increased to 30,000 p.s.i. by pumping pentaerythritol ester fluid into the inlet 17 of cap 11 from hydraulic pump. Thereafter the pressure was further increased to 96,000 p.s.i. by pumping water through inlet 17 from a small intensifier. The temperature of the contacting zone was then raised during a period of one hour from 84° F. to 1,000° F. and the pressure was increased during this period to 104,500 p.s.i. During the next two hours, the temperature was increased from 1,000° F. to 1018° F.; however, the pressure remained at 104,500 p.s.i. indicating the lack of leaks in the connection assembly and the overall resistance of the contacting apparatus to temperatures up to 1,000° F. and pressures up to 100,000 p.s.i. or higher.

*Run II*

This example demonstrates the efficacy of a dasher-mixer assembly such as is provided by elements 22, 23 and 24 in the figure at about 100,000 p.s.i. In this run, the unit was pressurized to 107,000 p.s.i. in the same manner as indicated in Run I. Because in all runs, for purposes of safety, the unit was installed in a reinforced concrete cell and was remotely controlled, a portable mircophone was attached to the unit to detect the dasher operation. The dasher was found to operate satisfactorily in a wate-pentaerythritol ester medium at 107,000 p.s.i. at three timed rates ranging from 10 to 350 strokes per minute.

*Run III*

This run illustrates a mixing operation carried out in the contacting zone of the apparatus. Accordingly, 0.505 g. of silica-alumina catalyst (100–150 mesh) was placed in the contacting zone. The dasher (i.e. the assembly of elements 22, 23 and 24) was then placed in the zone and the remainder of the contacting zone void was filled with isopropyl alcohol. The contacting zone was then pressurized through cap inlet 17 from an intensifier with additional isopropyl alcohol to 89,000–92,000 p.s.i. and heated to 500°–515° F. while maintaining the pressure at 89,000–92,000 p.s.i. The dasher was operated at 150 strokes per minute and after 6.6 hours of operation, a product containing 33.0 weight percent of isopropyl ether was recovered.

*Run IV*

In this run, the same apparatus was used as in Runs I–III except that the dasher assembly was omitted. 0.505 g. of silica alumina catalyst used in Run III was placed and supported in a dispersed manner on glass wool in the contacting zone. The remainder of the contacting zone void was filled with isopropyl alcohol. The reactor was pressurized as in Run III and held for 6.6 hours at 500°–505° F. and 9,000–93,000 p.s.i. The resulting product recovered contained 5.3 weight percent of isopropyl ether.

The above examples demonstrate the ability of the connector assembly in combination with a contacting apparatus to maintain very high pressures within the contacting zone. The stainless steel tubing used as the high pressure contacting tube was of relatively thin-walled construction and designed for use at pressures of 30,000 p.s.i. Using the connector assembly of the present invention, it was possible to operate the contacting apparatus at pressures above 100,000 p.s.i. at varying rates of dasher stroke.

It is preferred to utilize a solenoid dasher assembly in the contacting zone, i.e. an assembly which is actuated by solenoids positioned outside of the contacting zone. Placement of solenoids in the contacting zone itself, as has been done previously, causes construction and operating problems. The preferred dasher mixer operates with ease at high temperatures and pressures and, where a thin-walled contacting vessel, for example, having a walled thickness of ⅛ to ½-inch is used as in the preferred embodiment, the contacting vessel temperature can be readily raised from room temperature to 1000° F. in a very short period of time, thus shortening the period of time needed to heat the device to contacting temperature resulting in shortening of the total time needed in using the device for a given reaction or other contacting. Comparison of the results of Runs III and IV further illustrate the marked ability of the dasher assembly combined with the connector assembly in a contacting apparatus to give more complete reactions (see Run III) under approximately the same conditions even though the catalyst in Run IV was dispersed on its support throughout the reaction zone.

In the preferred embodiment wherein a solenoid actuated dasher mixer is employed as the stirring mechanism, there are no glands included in the apparatus which provide leakage sites and in combination with the connector provided herein, it is possible to operate using thin pressure chamber walls without leakage of the thin walls at their connection with the pressure connector combination of this invention. Thus, an advantage of the present invention is that thin-walled contacting zones, e.g. thin-walled reaction tubes, can be used at pressures up to 100,000 p.s.i. or higher and at temperatures up to 1,000° F. or higher without loss of pressure or charge material at the pressure connection. Thus, the present high pressure connector assembly extends operating conditions even with the thinner walled contacting zones of pressure vessels up to very high pressures and high temperatures.

It is evident from the foregoing that I have provided a new and useful apparatus for contacting separate phases at high pressure and high temperature. It is also evident that I have provided a new high pressure connector assembly for use in combination with a contacting vessel for providing such an apparatus.

I claim:

1. An apparatus for contacting separate phases at high pressure, which apparatus comprises a pressure vessel having a tubular inlet, a high-pressure connector element comprising a solid cylinder having two ends, said two ends consisting of solid sections of cones having axis concentric with the axis of said cylinder, the cone of the first of said ends having an acute angle at its apex, the cone of the second of said ends having an obtuse angle at its apex, a conduit through said pressure connector element concentric with the axes of said cylinder and said cones, said second end being positioned over the end of said tubular inlet whereby the conduit through said connector element communicates with said tubular inlet, a pressure cap over said second end and attached to said pressure vessel, a conic receptacle for said second end in said pressure cap, said pressure cap receiving said second end and urging said first end of said connector element in pressure sealing connection with the inlet tube, said receptacle having the angle of its apex at least as great as said acute angle, and a conduit through said cap from the narrow end of said receptacle, said conduits forming a continuous passage through said cap and said connector to said inlet.

2. The apparatus of claim 1 wherein said angle of the apex of said receptacle is about one degree greater than said acute angle.

3. The apparatus of claim 1 wherein the angles of the apexes of the cones of said ends are substantially the angles illustrated on element 12 in the figure of the drawings.

4. The apparatus of claim 3 wherein the connector element is about 1 1/16 inches in length and about 9/16 inches in diameter and wherein said acute angle is 59° and said obtuse angle is about 160°.

5. The apparatus of claim 1 wherein said pressure vessel comprises a cylindrical tube having a wall thickness of about ⅛ to ½ inch.

6. An apparatus for contacting separate phases at high pressure, which apparatus comprises a reactor comprising a thin walled tubular mixing chamber containing a solenoid actuated dasher mixing element and having a tubular inlet and a tubular outlet, two high pressure connector elements each comprising a solid cylinder having two ends, said two ends consisting of solid sections of cones having axes concentric with the axis of said cylinder, the cone of the first of said ends having an acute angle at its apex, the cone of the second of said ends having an obtuse angle a its apex, a conduit through a first of said pressure connector elements concentric with the axes of said cylinder and said cones of said first connector element, said second end of said first connector element being positioned over the end of said tubular inlet whereby the conduit through said connector element communicates with said tubular inlet, said second end of said second connector element being positioned over the end of said tubular outlet, a first pressure cap over said second end of said first connector element and attached to said reactor, a second pressure cap over said second end of said second connector element and attached to said reactor, a conic receptacle in each of said first and second pressure caps for said second ends, said pressure caps receiving said second ends and urging the first ends of said connector elements in pressure sealing connection with the inlet tube and outlet tube, said receptacles having the angle of apex at least as great as said acute angle, and a conduit through said cap from the narrow end of said receptacle whereby a continuous passage is formed through said first cap and said first connector element to said inlet.

7. The apparatus of claim 6 adapted for continuous mixing having a conduit through said second connector element concentric with the axes of the cylinder and cones of said second connector element whereby a continuous passage is formed through said second cap and second connector element to said outlet.

References Cited by the Examiner
UNITED STATES PATENTS

| | | | |
|---|---|---|---|
| 2,631,091 | 3/53 | Kuentzel et al. | 23—290 |
| 2,661,938 | 12/53 | Kuentzel | 259—113 |
| 2,780,444 | 2/57 | Hickey | 259—113 |
| 2,815,269 | 12/57 | Saunders et al. | 23—290 |
| 3,079,179 | 2/63 | Niemoth | 285—332 X |

MORRIS O. WOLK, *Primary Examiner.*

MAURICE A. BRINDISI, JAMES H. TAYMAN, JR.,
*Examiners.*